United States Patent [19]

Salaita et al.

[11] Patent Number: 4,853,537

[45] Date of Patent: Aug. 1, 1989

[54] MEASUREMENT OF THE EFFECTIVE PHOTO-ELECTRIC ABSORPTION CROSS SECTION OF ROCK SAMPLES

[75] Inventors: George N. Salaita, Anaheim, Calif.; Carol A. Quarles, Fort Worth, Tex.; Joseph C. Altman, Mountain View, Calif.

[73] Assignee: Chevron Research Company, San Francisco, Calif.

[21] Appl. No.: 92,091

[22] Filed: Sep. 1, 1987

[51] Int. Cl.[4] .............................................. G01V 5/00
[52] U.S. Cl. ..................................... 250/253; 250/256
[58] Field of Search ............... 250/253, 255, 256, 267, 250/269; 378/70

[56] References Cited

U.S. PATENT DOCUMENTS 4,617,825 10/1986 Ruhovets ............................ 250/256
4,661,700 4/1987 Holenka ............................... 250/267

OTHER PUBLICATIONS

Watson, "Numerical Simulation of the Litho-Density Tool Lithology Response," SPE 12051 (1985).
Bertozzi et al, "The Physical Foundation of Formation Lithology Logging with Gamma Rays", Geophysics, vol. 46, No. 10 (10/81), pp. 1439–1455.
Salaita et al, "The Effective Photo-Electric Absorption Cross Section for Selected Rock Samples".

Primary Examiner—Janice A. Howell
Assistant Examiner—Richard Hanig
Attorney, Agent, or Firm—S. R. La Paglia; E. J. Keeling

[57] ABSTRACT

A method and apparatus for determining photoelectric absorption cross-section is disclosed. A photon source is operably connected to a target chamber. A collimator connected to an opposite end of a sample chamber is oriented to receive photon energy from the source. A gamma ray detector is used to measure photon energy.

8 Claims, 8 Drawing Sheets

MEASUREMENT OF THE EFFECTIVE PHOTO-ELECTRIC ABSORPTION CROSS SECTION OF ROCK SAMPLES

BACKGROUND OF THE INVENTION

The effective photo-electric absorption cross section index or factor (PEF or Pe) can provide useful information about the lithology of a rock formation. It is important to have measurements of PEF for actual rock samples for which detailed elemental analysis is known in order: (1) to determine whether the experimental values of PEF agree with theory; (2) to test the additivity of absorption cross sections for mixtures; (3) to determine the accuracy of the common approximate formula for PEF, which depends only on the atomic number Z of the atoms in the sample; and (4) to study the effect of scattering corrections on the determination of PEF.

Knowledge of PEF is an important factor in effectively using the widely used Litho-Density Tools, as an example, the one by the commercial service companies manufactured by Schlumberger. A discussion of the Litho-Density tools is included with Watson, "Numerical Stimulation of the Litho-Density Tool Lithology Response", SPE 12051, (1985) which is incorporated by reference herein for all purposes.

Heretofore, it has been necessary to perform detailed elemental analysis on rock samples in order to determine PEF. Based on a detailed elemental analysis it is readily possible to compute PEF. However, such analyses are time consuming and costly.

It is desirable, therefore, to devise a method and apparatus for determining PEF of rock samples which is quick and inexpensive.

SUMMARY OF THE INVENTION

Apparatus for determining the effective photo-electric absorption cross section index of rock samples is disclosed. The apparatus has a photon (gamma ray) source such as AM-241 or another isotopic source of nearly equal photon energy or even an accelerator for produced photons; a target chamber operably connected to the source; a sample chamber connected to the target chamber and oriented to receive photon energy from the source; shielding surrounding the target chamber; a colliminator connected to the sample chamber opposite the target chamber; and gamma ray detector of the scintillation or solid state type operably connected to said colliminator.

A method of determining effective photo-electric absorption cross section index (PEF) of rock samples is also disclosed. The method comprises the steps of placing a photon source and directing the photon beam on a target into a sample chamber; measuring an energy of the photon beam; determining a number of photons produced at the energy with the photon beam; placing a sample of known composition in the sample chamber; determining a number of photons passing through the sample; calculating a theoretical PEF for the sample of known composition; calculating a measured PEF for the sample of known composition based on the total number of photons recorded prior to and post passing through said sample; determining a PEF correction factor from the theoretical PEF and calculated PEF; repeating the above for a rock sample of unknown composition; determining a number of photons passing through said rock sample of unknown composition; and determining PEF for said rock sample of unknown composition based on said PEF correction factor, said number of photons passing through said rock sample of unknown composition, and said number of photons produced.

DETAILED DESCRIPTION OF THE INVENTION

The index of the effective photo-electric absorption cross section, PEF, is defined for a monoatomic sample as $$PEF = (Z/10)^{3/6} \tag{1}$$

where Z is the atomic number of the element constituting the sample.

For samples composed of several elements, it is assumed that PEF can be determined using a simple weighting by the electron density $n_i$ of each atom. Namely, $$PEF = \frac{\Sigma\, n_i Z_i PEF_i}{\Sigma\, n_i Z_i} = \frac{\Sigma\, n_i Z_i^{4.6}}{10^{3.6}\, \Sigma\, n_i Z_i}. \tag{2}$$

Bertozzi et al., "The Physical Foundation of Formation Lithology Logging with Gamma Rays," (1981) have shown that the photo-electric absorption cross section $\mu_p$ can be approximated over the range of Z from 6 to 26 and photon energy E from 40 to 150 keV by $$\mu_p = 12.1 Z^{4.6} E^{-3.15} \text{ (barns/atom).} \tag{3}$$

This approximation can be used to define PEF given by equation (1) in terms of quantities accessible experimentally, i.e.:

$$PEF(E) = \frac{E^{3.15}}{12.1 \times 10^{3.6}} \frac{\mu_P(E)}{Z}. \tag{4}$$

Equation (4) will give the same numerical result as equation (1) in the case that the photo-electric absorption cross section is exactly equal to that assumed in equation (3); but can differ significantly for Z greater than 26. For a mixture of atoms, the weighting assumption then becomes $$PEF(E) = \frac{E^{3.15}}{12.1 \times 10^{3.6}} \frac{\Sigma n_i \mu_{Pi}(E)}{\Sigma n_i Z_i}. \tag{5}$$

Equation (5) implicitly assumes that the photo-electric cross section for a mixture is obtained by a simple weighted addition of the photo-electric cross sections of the atoms in the mixture. This additivity assumption which will be extended to the other atomic cross sections, such as Rayleigh and Compton scattering, and is verified.

Figure 1:
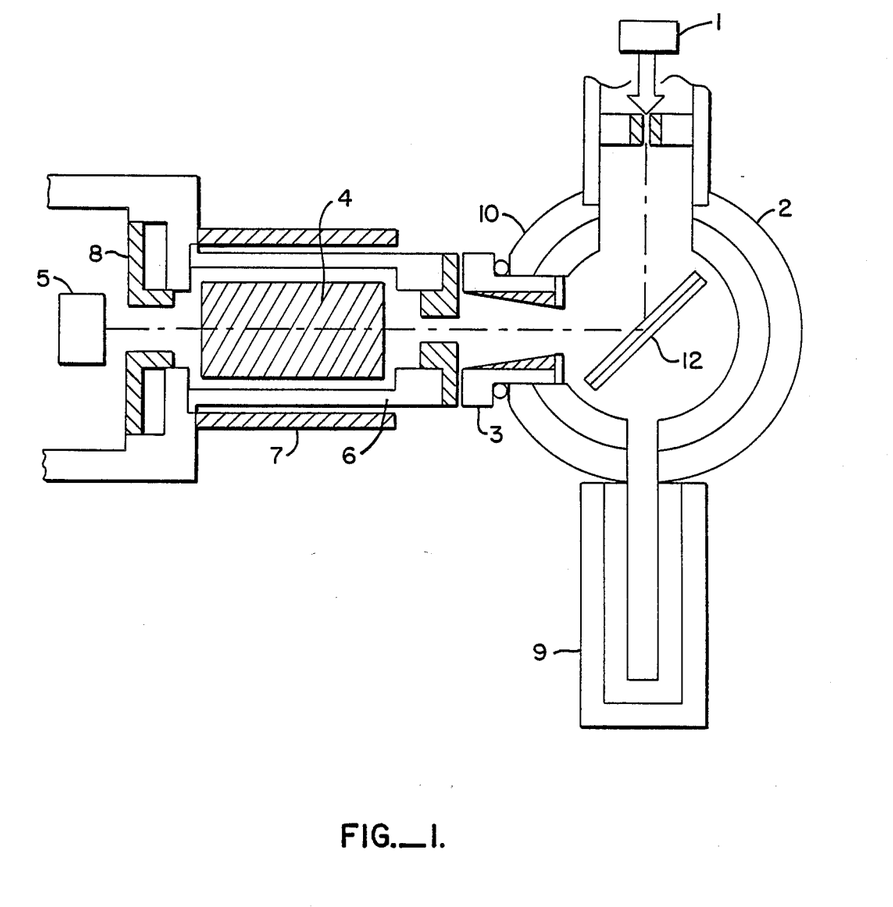
FIG. 1 illustrates the apparatus used to measure photo-electric absorption cross section index described herein.
Figure 1A:
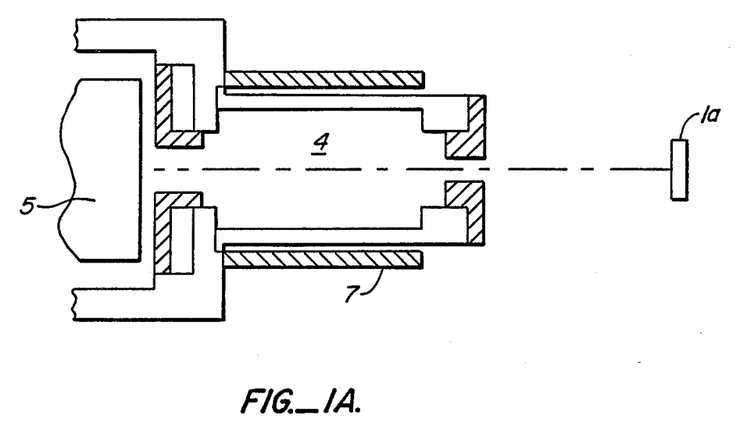
FIG. 1A shows the apparatus which uses a single monoenergetic isotope source.

Referring to FIG. 1, a photon source 1 (a thin-target atomic-field bremsstrahlung beam produced by the bombardment of a thin-film copper target by an electron beam of 150 keV energy) is used in the device. Alternatively, as shown in FIG. 1a, a more isotope source 1a can be used, such as a monoenergetic isotope source. A bremsstrahlung beam emerges from a target chamber 2 through a mylar window 3 and is well collimated. The bremsstrahlung beam provides a relatively uniform photon source with photon energy E ranging from 10 to 150 keV. The photons are transmitted through the sample 4 and are detected in a high purity germanium planar X-ray detector 5 or alternately a gamma ray scintillation or equivalent detector of the type used in the industry [such as a NaI(TL),CsI,GO]. The samples are placed in a sample holder 6 which is surrounded by lead shielding 7. The detector is collimated with a lead collimator 8. Faraday cup 9 serves to monitor the electron beam intensity or total charge used for data normalization. Scattering chamber 10 is maintained at a low pressure and serves to reduce the effect of room scattering. Target 12 serves to produce the photon beam.

Figure 2:
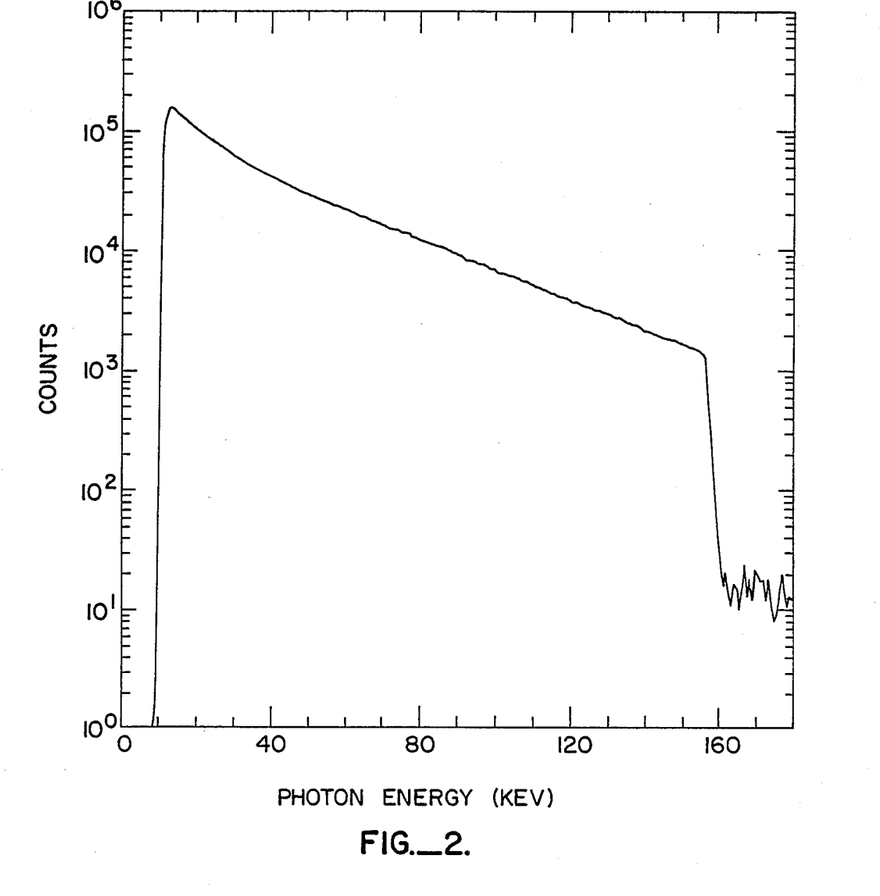
FIG. 2 shows a bremsstrahlung spectrum when no sample is in the device shown in FIG. 1.
Figure 3:
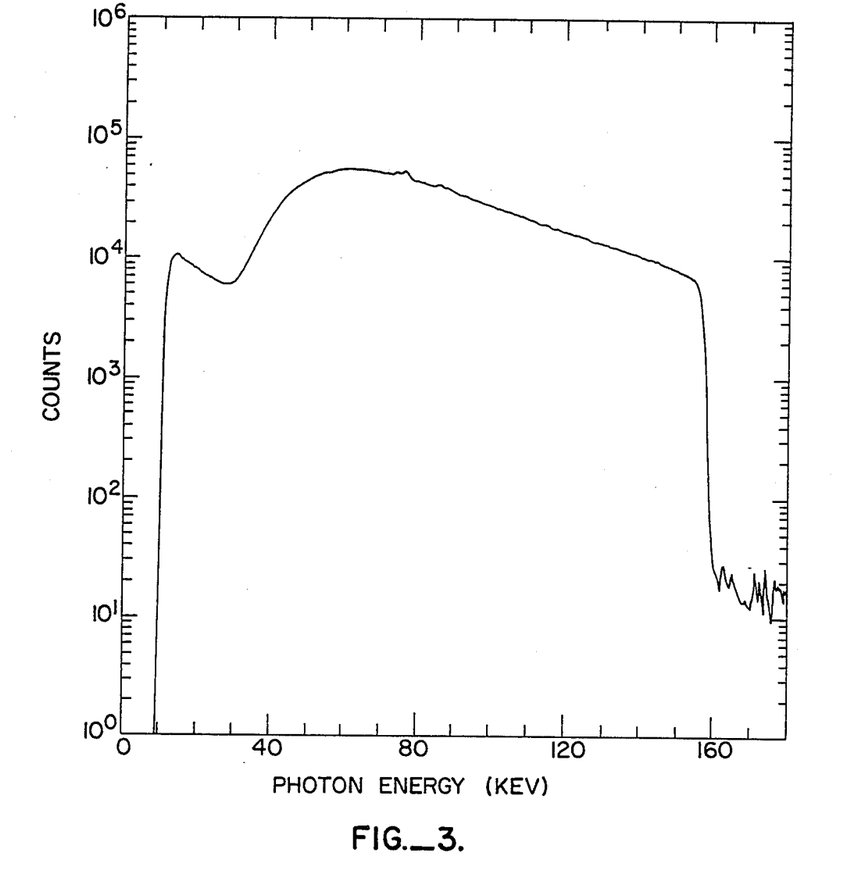
FIG. 3 shows a bremsstrahlung spectrum when a typical rock sample is in place.

A typical bremsstrahlung spectrum is shown in FIG. 2 when there is no sample in the holder. A typical photon spectrum obtained with a sample (berea sandstone) in place is shown in FIG. 3. The total photon absorption cross section is obtained by taking the ratio of the number of photons N at energy E with a sample in place to the number of photons $N_o$ at energy E in the incident beam. This ratio, $N/N_p(E)$, is then normalized by the ratio of the measured total electron charge incident on the copper target.

Figure 4:
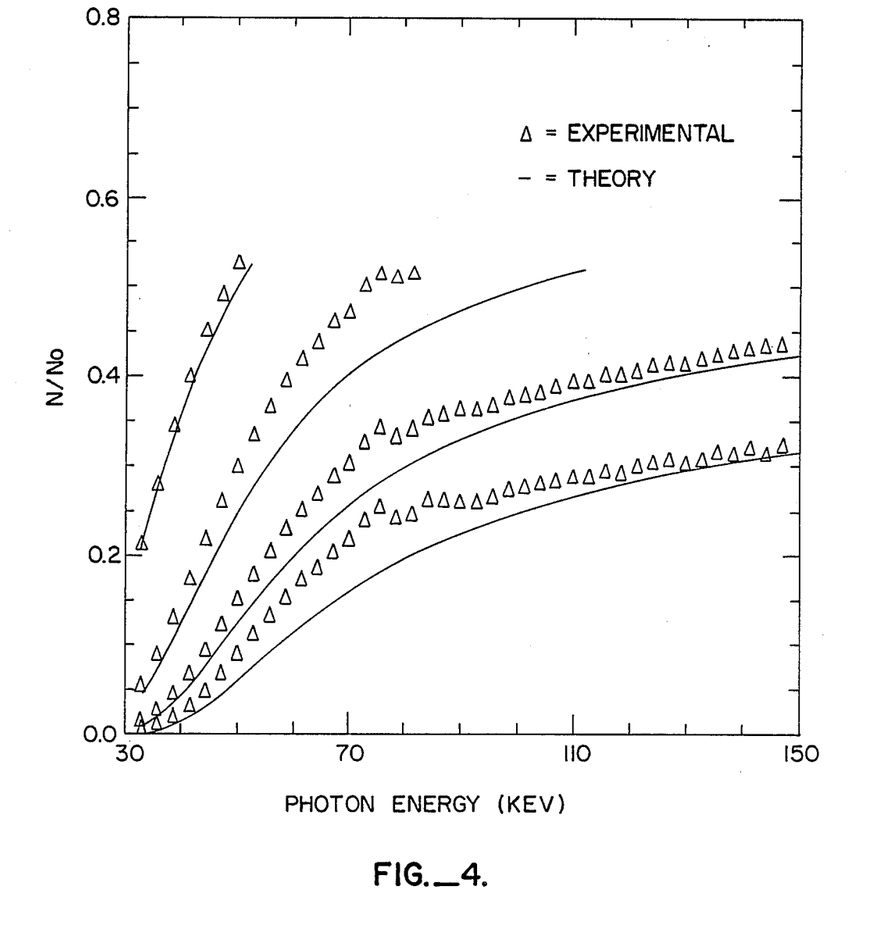
FIG. 4 compares measured and theoretical photon absorption spectra for berea sandstone samples of known composition and varying thickness.

A typical photon absorption spectrum $N/N_o(E)$ is shown in FIG. 4 for several Berea Sandstone samples. The lowest photon absorption (top curve) corresponds to a 1-cm sample with increasing absorption observed of the thicker samples, as expected. The solid lines represent the Storm and Israel theory and are given by $$N/N_o(E) = \exp[-mK\alpha_t(E)], \tag{6}$$

where m is the sample mass in grams and K is a conversion factor equal to $10^{-24}$ times Avogadro's Number divided by the sample cross sectional area. $\alpha_t(E)$ is the total atomic absorption cross section in barns per atomic mass; i.e.:

$$\alpha_t = \alpha_P + \alpha_R + \alpha_C = \Sigma(w_i/A_i)(\mu_{Pi} + \mu_{Ri} + \mu_{Ci}). \tag{7}$$

The summation is over all atom types in the sample and the indices P, R, and C refer to Photo-electric, Rayleigh, and Compton respectively. $A_i$ is the atomic mass of atom species i and $w_i$ is the mass proportion of atomic species i ($\Sigma w_i = 1.0$).

Equations (2) and (5) can be expressed in terms of these new quantities to obtain:

$$PEF = \frac{\Sigma(w_i/A_i)Z_i^{4.6}}{10^{3.6} \Sigma(w_i/A_i)Z_i} \tag{8-a}$$

$$PEF(E) = \frac{E^{3.15}}{12.1 \times 10^{3.6}} \times \frac{\alpha_{Pi}(E)}{\Sigma(w_i/A_i)Z_i}. \tag{8-b}$$

Equation (8-a) provides an approximate value for PEF for a sample whose elemental analysis is known. Equation (8-b) provides a way of determining PEF as a function of photon energy E in terms of $\alpha_p$ with the apparatus described herein. The $\alpha_p$ can alternatively be determined from theory such as Storm and Israel or from experiment as discussed below.

The essential experimental problem in determing PEF is thus to determine $\alpha_p(E)$ for the sample. As seen in FIG. 4, the data exhibit systematically less absorption than that predicted by the theory. The largest discrepancy is in the region around 75 keV. This is interpreted as extra photons scattered into the detector by scattering in the sample, the shielding, and the collimators. Lead X-rays between 70 and 85 keV are evident which arise from fluorescence of the shielding and collimators by scattered photons.

To correct for this scattering effect, the theory given by equation (6) is subtracted from the corresponding data. This difference is independent, within the statistical error, of both the composition and the length of the samples studied. Thus it is possible to construct a common correction factor which can be applied to all samples uniformly. This correction factor, shown in FIG. 5 with the estimated standard error, depends on the geometry of the experiment. Although small, the correction is significant and for the thickest samples the uncertainty in the correction introduces the largest error in the determination of $\alpha_p$.

Figure 5:
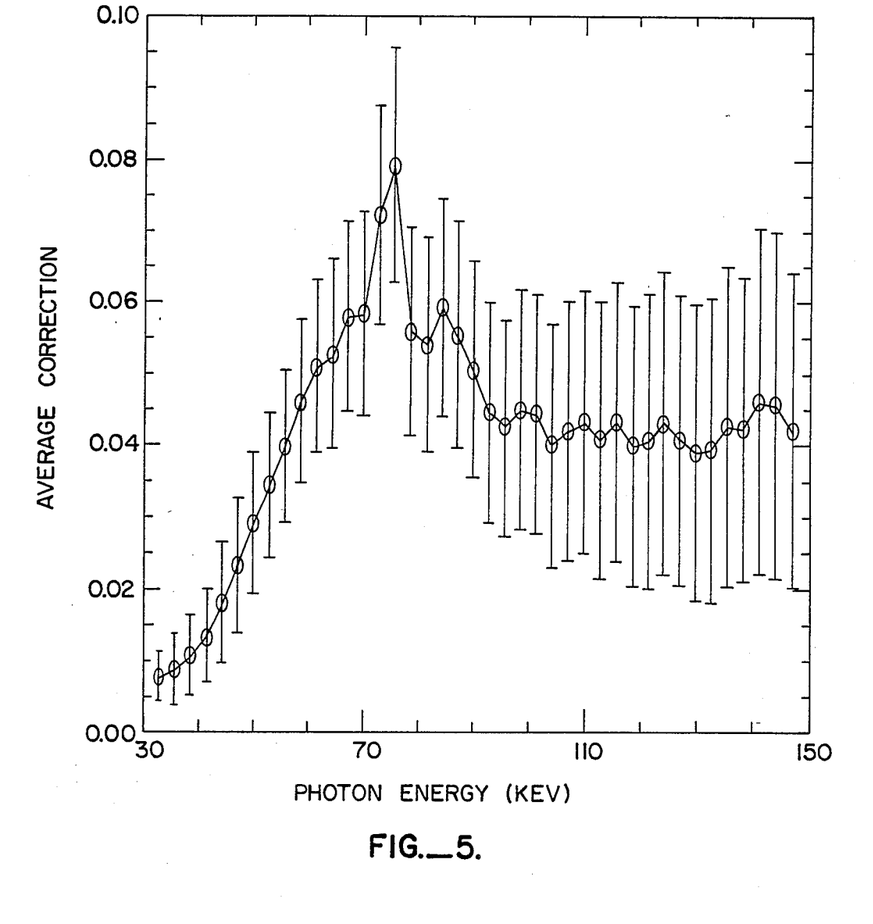
FIG. 5 shows a graph of a correction factor versus photon energy.

$\alpha_p$ is now experimentally determined for each of the samples from the following semi-empirical formula $$\alpha_P(E) = \alpha_R - \alpha_C - \frac{1}{mK} \text{Ln}\left[\frac{N}{N_O}(E) - C(E)\right]. \tag{9}$$

Here $\alpha_R$ and $\alpha_C$ are assumed known from Storm and Israel theory. ($N/N_o(E)$ is the experimental total photon absorption spectrum and C(E) is the empirically determined geometric scattering correction factor discussed above.

Figure 6:
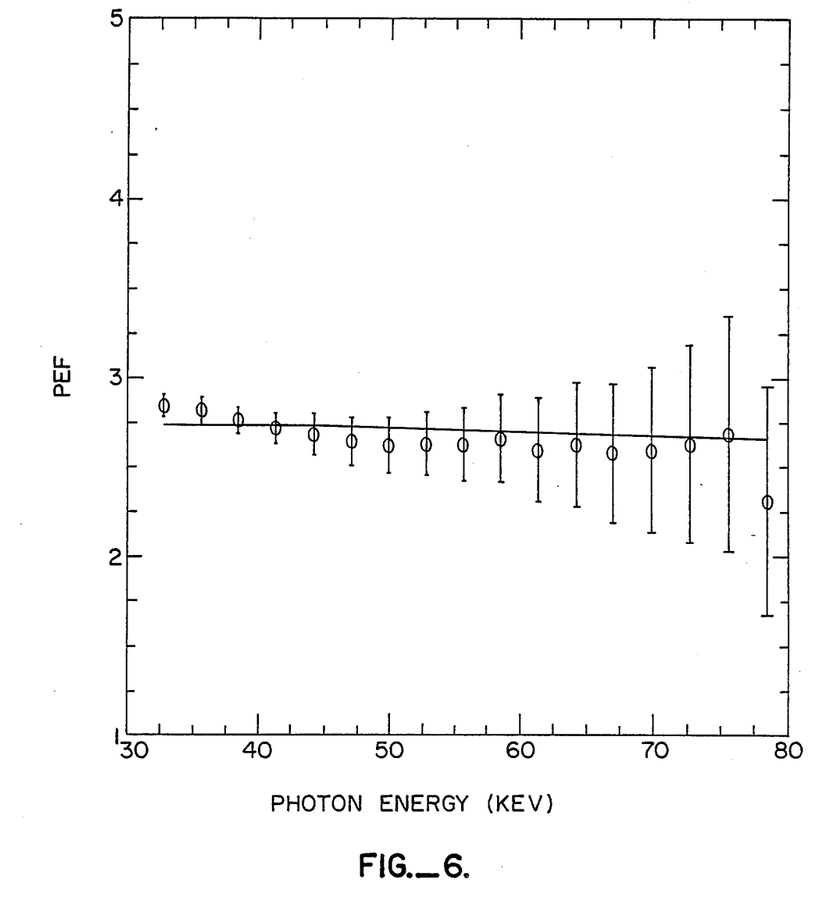
FIG. 6 shows theoretical PEF and PEF determined with the method and apparatus described herein for 1 cm aluminum.
Figure 7:
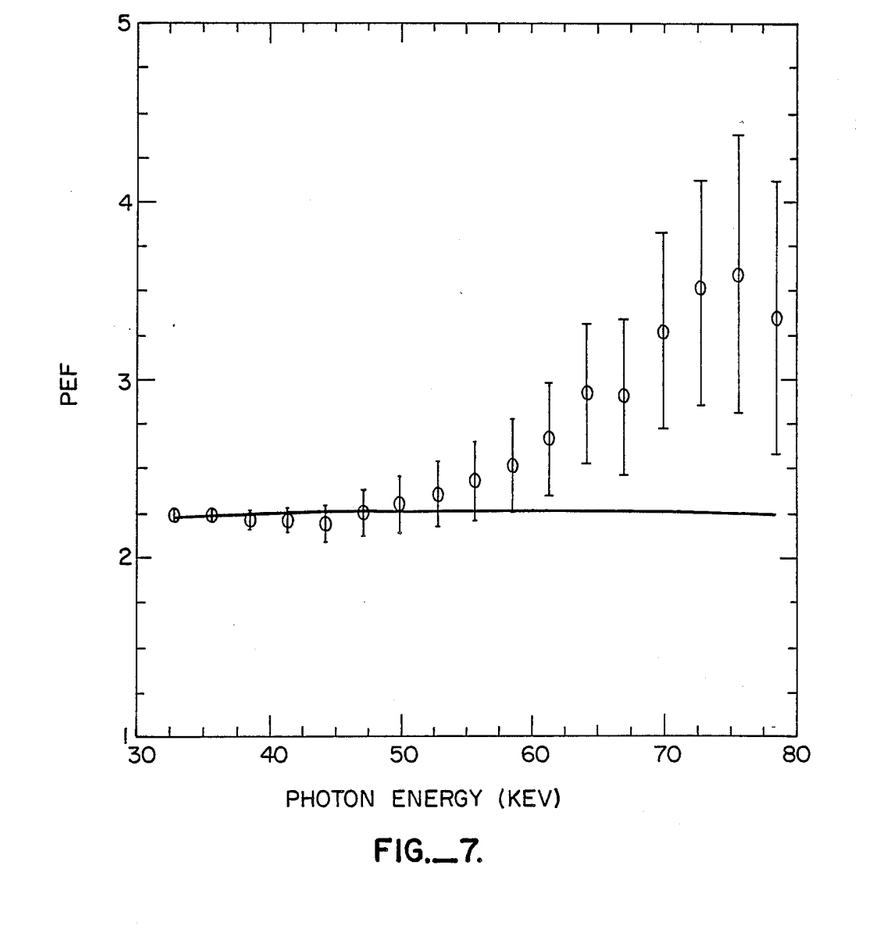
FIG. 7 shows theoretical PEF and PEF determined with the method and apparatus described herein for 1 cm berea sandstone.

Typical results for PEF(E) are shown in FIG. 6 for aluminum; and in FIG. 7 for Berea Sandstone, a predominantly sandstone sample. The points are the result of using the experimental values of $\alpha_p$ from equation (9) in equation (8-b). The line uses the theory of Storm and Israel to determine $\alpha_p$. The errors are statistical, represent the one standard deviation level, and include the uncertainty in the geometrical scattering correction.

As can be seen from the figures, the error associated with PEF varies with photon energy. Some of the variation from sample to sample is the result of different data collection times. There can also be some small systematic error for some samples due to normalization to the total electron charge or electron beam drift. Smaller errors occur in the thinner samples where there is significant transmission, for energies where the photoelectric cross section dominates over the Compton and Rayleigh process, and where the data is sufficiently larger than the geometric correction that the error in this correction remains relatively small. Generally, PEF is not as well determined in the thicker, more dense samples.

It is believed that much of the error seen at the higher photon energy levels shown in, for example, FIG. 7 is due to the production of X-rays by the shrouding material. Much of this error would be eliminated through the use of improved shrouding material such as, for example, zirconium, brass or densalloy or combination of these. When such materials are used, the errors associated with the device would be extremely low, particularly at the energy levels of interest for well logging purposes (60 keV).

It is to be understood that the scope of the above descriptions are intended to be illustrative and not restrictive. The scope of the invention should, therefore, not be determined with reference to the above description, but instead with reference to the appended claims, along with their full range of equivalents.

What is claimed is:

1. Apparatus for determining the effective photoelectric absorption cross section of rock samples comprising:
    (a) an electron source;
    (b) a target chamber operably connected to said source;
    (c) a target within said target chamber;
    (d) a means for monitoring the electron beam intensity of said source;
    (e) a sample chamber connected to said target chamber and oriented to receive photon energy from said target chamber;
    (f) shielding surrounding said target chamber;
    (g) a collimator connected to said sample chamber opposite said target chamber, and;
    (h) a detector operably connected to said collimator, said detector selected from the group: gamma ray detectors and X-ray detectors.

2. Apparatus as recited in claim 1 wherein said source is a means for producing a thin-target atomic-field bremsstrahlung beam.

3. Apparatus as recited in claim 1 wherein said source is a means for bombarding a thin-film copper target with an electron beam.

4. Apparatus as recited in claim 1 wherein said X-ray or gamma detector is a high purity germanium X-ray or scintillation detector.

5. Apparatus as recited in claim 1 wherein said shielding is lead shielding.

6. Apparatus as recited in claim 1 wherein said shielding is zirconium.

7. A method of determining effective photo-electric absorption cross section (PEF) of rock samples comprising the steps of:
    (a) producing a photon beam;
    (b) reflecting said photon beam on a target into a sample chamber;
    (c) measuring an energy of said photon beam;
    (d) determining a number of photons produced at said energy with said photon beam;
    (e) placing a sample of known composition in said sample chamber;
    (f) determining a number of photons passing through said sample;
    (g) calculating a theoretical PEF for said sample of known composition;
    (h) calculating a measured PEF for said sample of known composition from measured absorption cross section based on said total electron charge, said number of photons produced, and said number of photons passing through said sample;
    (i) determining a PEF correction factor from the theoretical PEF and calculated PEF;
    (j) repeating step (e) and (f) for a rock sample of unknown composition;
    (k) determining a number of photons passing through said rock sample of unknown composition; and
    (l) determining PEF for said rock sample of unknown composition based on said PEF correction factor, said number of photons passing through said rock sample of unknown composition, said total electron charge and said number of photons produced.

8. Apparatus for determining the effective photoelectric absorption cross section of rock samples comprising:
    (a) an isotopic source of photons;
    (b) a sample chamber operably connected to said source of photons and oriented to receive photon energy from said source;
    (c) a collimator connected to said sample chamber opposite said source, and;
    (d) a detector operably connected to said collimator, said detector selected from the group: gamma ray detectors and x-ray detectors.

* * * * *

UNITED STATES PATENT AND TRADEMARK OFFICE
CERTIFICATE OF CORRECTION

PATENT NO. : 4,853,537

DATED : August 1, 1989

INVENTOR(S) : George N. Salaita et al

It is certified that error appears in the above-identified patent and that said Letters Patent is hereby corrected as shown below:

First page, Inventors: add --Hbbulhalin E. Lehtihet-- per our Amendment and Petition to Correct and/or Add To Original Named Inventors [37 CFR 1.48(a)] dated 3/9/88

Claim 4, Col. 5, line 47: "or gamma detector" should read --or gamma ray detector--

Signed and Sealed this

Third Day of April, 1990

*Attest:*

HARRY F. MANBECK, JR.

*Attesting Officer*  *Commissioner of Patents and Trademarks*